US009617846B2

(12) United States Patent
Nikitenko et al.

(10) Patent No.: US 9,617,846 B2
(45) Date of Patent: Apr. 11, 2017

(54) METHODS OF TRANSIENT EM DATA COMPRESSION

(71) Applicants: Marina N. Nikitenko, Novosibirsk (RU); Arcady Reiderman, Houston, TX (US); Michael Boris Rabinovich, Houston, TX (US); Anton Mosin, Novosibirsk (RU)

(72) Inventors: Marina N. Nikitenko, Novosibirsk (RU); Arcady Reiderman, Houston, TX (US); Michael Boris Rabinovich, Houston, TX (US); Anton Mosin, Novosibirsk (RU)

(73) Assignee: BAKER HUGHES INCORPORATED, Houston, TX (US)

( * ) Notice: Subject to any disclaimer, the term of this patent is extended or adjusted under 35 U.S.C. 154(b) by 179 days.

(21) Appl. No.: 14/546,134

(22) Filed: Nov. 18, 2014

(65) Prior Publication Data
US 2015/0137818 A1 May 21, 2015

(30) Foreign Application Priority Data
Nov. 18, 2013 (WO) ................ PCT/RU2013/001030

(51) Int. Cl.
*G01V 3/02* (2006.01)
*G01V 3/12* (2006.01)
*E21B 47/12* (2012.01)
*G01V 3/34* (2006.01)

(52) U.S. Cl.
CPC .............. *E21B 47/122* (2013.01); *G01V 3/34* (2013.01)

(58) Field of Classification Search
CPC .............. E21B 47/12; G01V 3/02; G01V 3/12
See application file for complete search history.

(56) References Cited

U.S. PATENT DOCUMENTS

| 5,031,155 | A | 7/1991 | Hsu |
| 5,282,133 | A | 1/1994 | Watson |
| 5,517,115 | A | 5/1996 | Prammer |
| 5,790,131 | A | 8/1998 | Liang et al. |
| 6,249,762 | B1 * | 6/2001 | Kirsteins ........... H04L 25/03006 379/386 |
| 7,369,979 | B1 | 5/2008 | Spivey |

(Continued)

OTHER PUBLICATIONS

Written Opinion for PCT Application No. PCT/RU2013/001030, dated Aug. 5, 2014, pp. 1-4.
(Continued)

*Primary Examiner* — Huy Q Phan
*Assistant Examiner* — Alvaro Fortich
(74) *Attorney, Agent, or Firm* — Cantor Colburn LLP

(57) ABSTRACT

A system and method to compress transient signals are described. The system includes a transmitter disposed in a borehole to change a transmitted current and induce a current in an earth formation, and a receiver disposed in the borehole to receive the transient signals resulting from the transmitted current. The system also includes a processor to compress the transient signals, the processor compressing the transient signals based on a spline approximation method or an Eigen value method for each transient signal based on whether the spline approximation method or the Eigen value method results in a fewer number of parameters representing the transient signal.

20 Claims, 12 Drawing Sheets

(56) References Cited

U.S. PATENT DOCUMENTS

| | | | |
|---|---|---|---|
| 7,558,153 B2 | 7/2009 | Zeroug et al. | |
| 7,567,869 B2 | 7/2009 | Nikitenko et al. | |
| 7,574,057 B1 | 8/2009 | Yang | |
| 8,035,392 B2 | 10/2011 | Itskovich et al. | |
| 2005/0267695 A1* | 12/2005 | German | G01N 3/30 702/41 |
| 2007/0038691 A1* | 2/2007 | Candes | G06F 17/148 708/400 |
| 2007/0067166 A1* | 3/2007 | Pan | G10L 19/0216 704/222 |
| 2009/0167556 A1 | 7/2009 | Signer et al. | |
| 2009/0174402 A1 | 7/2009 | Rottengatter et al. | |
| 2009/0190850 A1 | 7/2009 | Tang | |
| 2009/0237084 A1* | 9/2009 | Itskovich | G01V 3/28 324/339 |
| 2009/0292473 A1 | 11/2009 | Kruspe et al. | |
| 2010/0169105 A1* | 7/2010 | Shim | G10L 21/04 704/503 |
| 2010/0271030 A1* | 10/2010 | Reiderman | G01V 3/28 324/338 |
| 2011/0098931 A1 | 4/2011 | Kosmala et al. | |
| 2011/0112810 A1 | 5/2011 | Scoullar et al. | |
| 2012/0051549 A1* | 3/2012 | Nagel | G10L 19/025 381/56 |
| 2012/0209528 A1* | 8/2012 | Itskovich | G01V 3/28 702/7 |
| 2012/0253770 A1* | 10/2012 | Stern | G01V 11/00 703/10 |
| 2013/0032404 A1* | 2/2013 | Donderici | E21B 47/024 175/45 |
| 2013/0166213 A1* | 6/2013 | Homan | G01V 3/30 702/7 |
| 2015/0153476 A1* | 6/2015 | Prange | E21B 43/00 703/2 |

OTHER PUBLICATIONS

International Search Report for PCT Application No. PCT/RU2013/001030, dated Aug. 5, 2014, pp. 1-13.

* cited by examiner

METHODS OF TRANSIENT EM DATA COMPRESSION

CROSS-REFERENCE TO RELATED APPLICATION

This application claims the benefit of priority to PCT Application No. PCT/RU2013/001030 filed Nov. 18, 2013, the disclosure of which is incorporated herein by reference in its entirety.

BACKGROUND

In downhole exploration and production operations, sensors and measurement devices are used to obtain information about a variety of parameters that may be helpful in improving aspects of the efforts. Information about the downhole environment (e.g., pressure, temperature) as well as formations (e.g, resistivity, density) are obtained and processed. The transmission of all of the data obtained downhole for processing at the surface can present challenges when real time processing is desired.

SUMMARY

According to an aspect of the invention, a system to compress transient signals includes a transmitter disposed in a borehole and configured to change a transmitted current and induce a current in an earth formation; a receiver disposed in the borehole and configured to receive the transient signals resulting from the transmitted current; and a processor configured to compress the transient signals, the processor configured to compress the transient signals based on a spline approximation method or an Eigen value method for each transient signal based on whether the spline approximation method or the Eigen value method results in a fewer number of parameters representing the transient signal.

According to another aspect of the invention, a method of compressing transient signals includes obtaining the transient signals; compressing, using a processor, the transient signals, the processor compressing each transient signal based on a spline approximation method or an Eigen value method based on whether the spline approximation method or the Eigen value method results in a fewer number of parameters representing the transient signal; and transmitting the parameters representing each transient signal for recovery of the transient signal.

BRIEF DESCRIPTION OF THE DRAWINGS

Referring now to the drawings wherein like elements are numbered alike in the several Figures.

DETAILED DESCRIPTION

As noted above, real time transmission of data obtained downhole can be challenging because of the volume of data and the available bandwidths for transmission. As such, compression methods for data have been used to reduce the transmitted data set. Embodiments of the system and method described herein relate to transient electromagnetic data compression.

Figure 1:
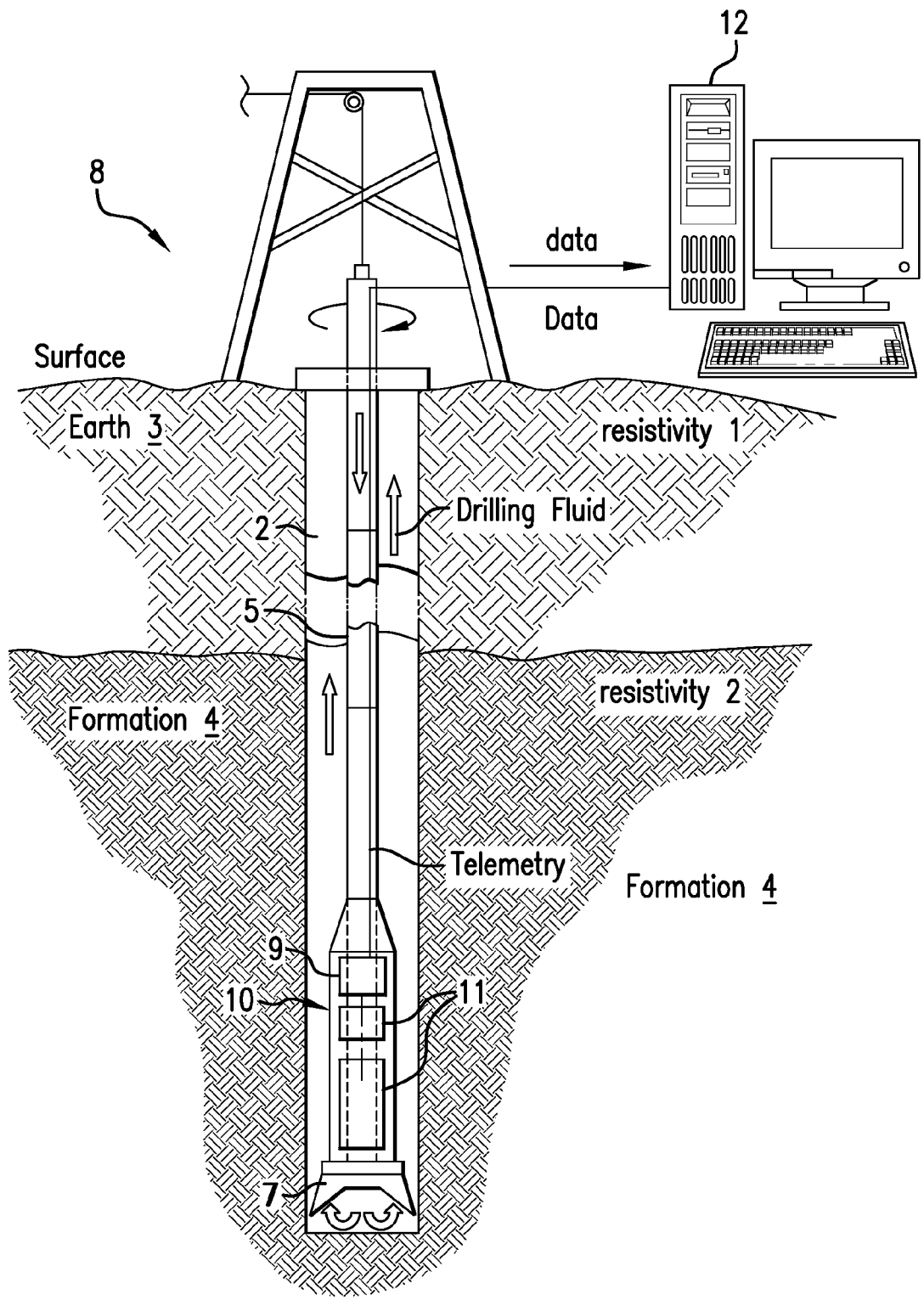
FIG. 1 is a cross-sectional view of a system to obtain and compress transient electromagnetic signals according to an embodiment of the invention.

FIG. 1 is a cross-sectional view of a system to obtain and compress transient electromagnetic signals according to an embodiment of the invention. While the system may operate in any subsurface environment, FIG. 1 shows a downhole tool 10 disposed in a borehole 2 penetrating the earth 3. The downhole tool 10 is disposed in the borehole 2 at a distal end of a carrier 5. The downhole tool 10 may include measurement tools 11 and downhole electronics 9 configured to perform one or more types of measurements in an embodiment known as Logging-While-Drilling (LWD) or Measurement-While-Drilling (MWD). According to the LWD/MWD embodiment, the carrier 5 is a drill string. The measurements may include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2. Raw data and/or information processed by the downhole electronics 9 may be telemetered to the surface for additional processing or display by a computing system 12. Drilling control signals may be generated by the computing system 12 and conveyed downhole or may be generated within the downhole electronics 9 or by a combination of the two according to embodiments of the invention. The downhole electronics 9 and the computing system 12 may each include one or more processors and one or more memory devices. In alternate embodiments, the carrier 5 may be an armored wireline used in wireline logging. Different layers of the downhole environment may have different resistivities (e.g., resistivity 2 of formation is different than resistivity 1) as shown in FIG. 1. The downhole tool 10 according to embodiments obtains electromagnetic information. The downhole tool 10 may include one or more transmitters (transmitter coils) that turn the current impulse in the transmitter coil on and off to induce a current in the earth 3 (formation 4) and one or more receivers that receive the resulting transient electromagnetic (TEM) signals. The transmitter and receiver may be one-, two-, or tri-axis devices, but a tri-axis transmitter and receiver are discussed in the examples below.

Different embodiments for compressing these TEM signals are detailed below. In each embodiment, the time interval and discrete time points at which a TEM signal is recorded are assumed to be fixed. As such, the time points need not be transmitted along with the TEM signal. The measured time-dependent TEM signals may be preprocessed (e.g., filtered to remove random noise). Transient signals depending on time may be classified based on being: monotonous, non-monotonous like-sign, and non-monotonous and crossing zero at one, two, or three points. A common feature of all TEM signals is that the signals decay as power functions. As further discussed below, different embodiments of the invention may be better-suited to different TEM signals.

Figure 2:
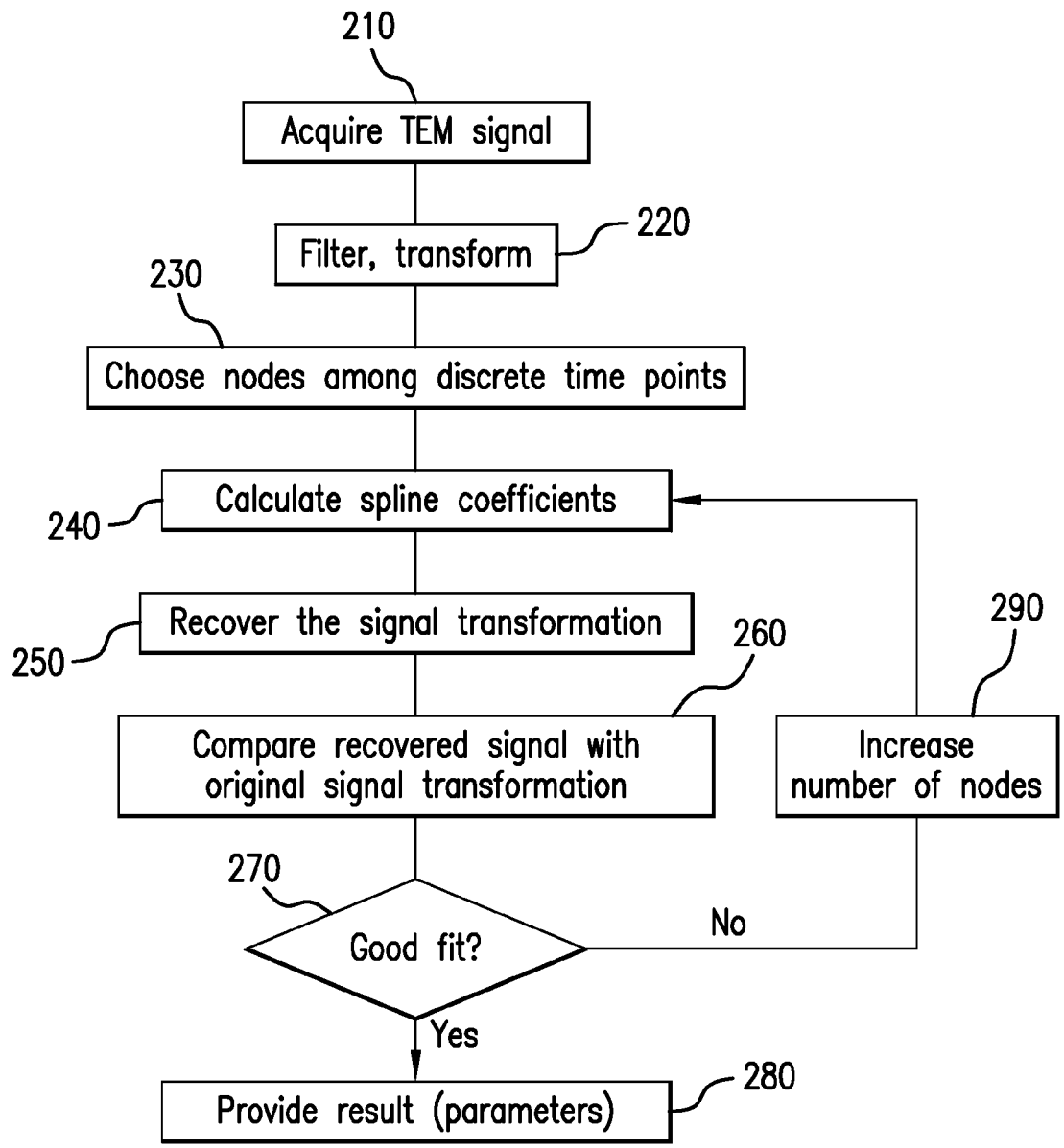
FIG. 2 is a process flow of a method of compression that includes generating a spline approximation of a TEM signal according to an embodiment of the invention.

FIG. 2 is a process flow of a method of compression that includes generating a spline approximation of a TEM signal according to an embodiment of the invention. The transformation does not change the sign of the original TEM signal and includes multiplying the TEM signal by power. If the transformation changed the sign (e.g., logarithm or power function of absolute signal value) then the singularity appears in zero and requires additional parameters to describe the signal because auxiliary conditions would have to be included at zero. At block 210, acquiring the TEM signal includes the transmitter coil of the downhole tool 10 inducing current in the formation and the receiver receiving the TEM signal. The filtering and transforming of the TEM signal at block 220 may be performed by the downhole electronics 9, for example. The transformation is given by:

$$F_j = F(t_j), j=1,n$$ [EQ. 1]

where n is the number of time values and is calculated after preprocessing of the recorded TEM signal.

At block 230, choosing nodes among discrete time points is based on the type of spline approximation used. As one example, when a cubic spline is used, choosing nodes includes calculating time derivatives at the first and last time points $$\frac{\partial F}{\partial t}(t_1), \frac{\partial F}{\partial t}(t_n),$$

which involves a numerical calculation. The time interval $[t_1, t_n]$ is divided into m−1 intervals, m=2, M, where M is a threshold. When the times grow geometrically, and n (times values) is much bigger than m (number of nodes), then the nodes $u_i$, i=1, m are determined as $$u_i = t_j, j = \frac{n}{m-1} \cdot (i-1) + 1, i = 1, m-1; u_m = t_n$$ [EQ. 2]

At block 240, calculating spline coefficients is for the chosen nodes m. In the exemplary case of the cubic spline, calculating spline coefficients is done using the derivatives. At block 250, recovering the signal transformation includes recovering $R_j = R(t_j)$, j=1,n with the calculated coefficients. At block 260, comparing the recovered signal with the original signal transformation includes determining a misfit measure Δ as:

$$\Delta = \sqrt{\frac{1}{n} \sum_{j=1}^{n} \left(\frac{F_j - R_j}{F_j \cdot w_j}\right)^2} \cdot 100\%$$ [EQ. 3]

where $w_j$ are the weights.

At block 270, determining whether there is a good fit includes determining if the misfit measure Δ is below a predetermined value. When the recovered signal is a good fit with the original transformation, then the process includes providing the results at block 280 as k=m+j parameters, wherein m values of the signal at m nodes and j additional parameters are provided based on the type of spline approximation used. For the exemplary $C^2$ (twice continuously differentiable) cubic spline type, 2 additional parameters—the derivatives at the first and last time points—are used. When the recovered signal is not a good fit with the original transformation, then the process includes increasing the number of nodes, m, at block 290, and the spline coefficients are calculated again (block 240). This process of assessing the fit continues until block 280 is reached. After transmission (for example to the computing system 12 at the surface) to obtain and process the TEM signal, the processor of the computing system 12 would implement the processing of 250.

Figure 3:
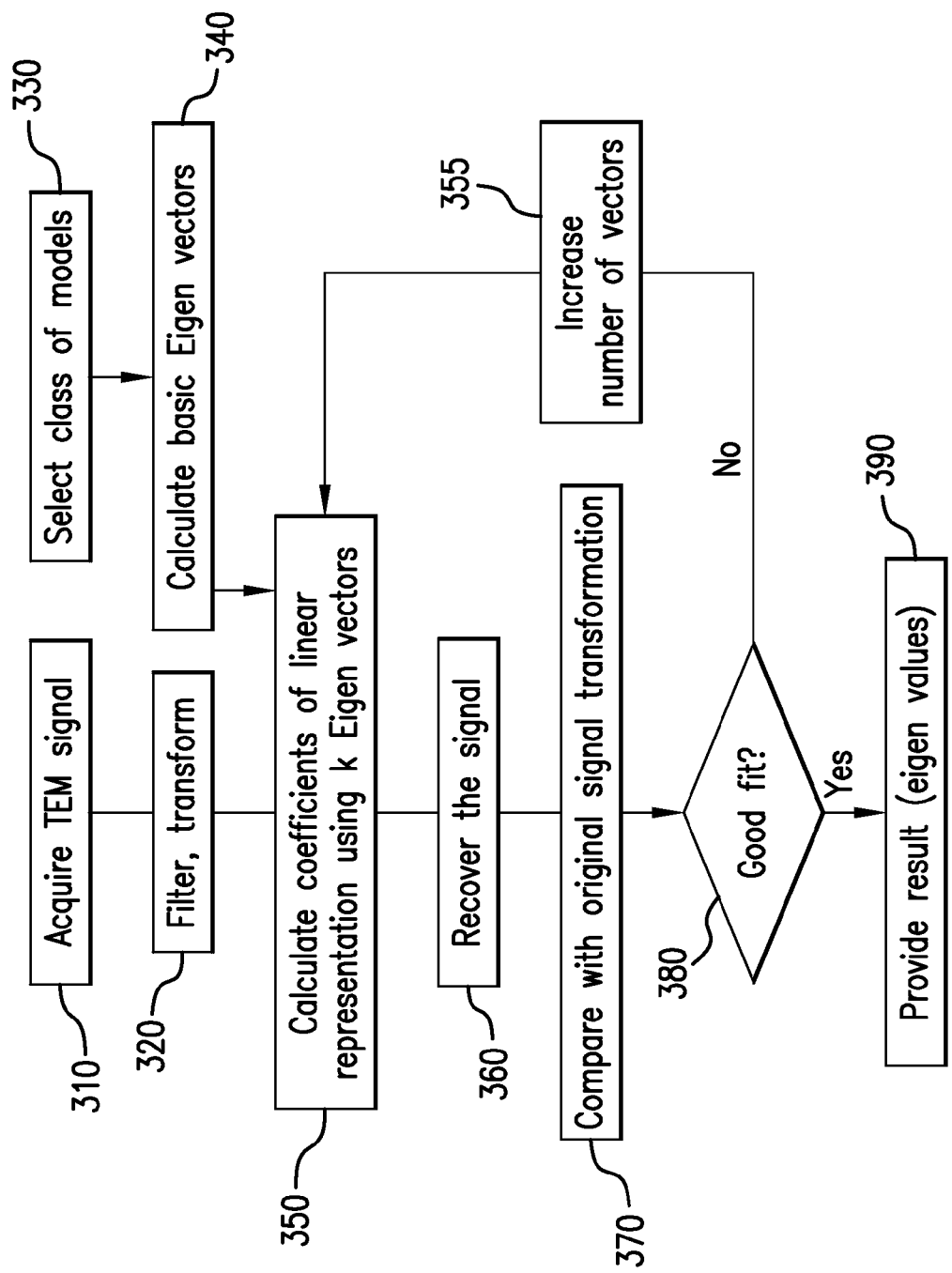
FIG. 3 is a process flow of a method of compression that includes generating Eigen values from a TEM signal according to another embodiment of the invention.

FIG. 3 is a process flow of a method of compression that includes generating Eigen values from a TEM signal according to another embodiment of the invention. At block 310, acquiring the TEM signal includes the transmitter coil of the downhole tool 10 inducing current in the formation and the receiver receiving the TEM signal. The filtering and transforming of the TEM signal at block 320 may be performed by the downhole electronics 9, for example. The TEM signal transformation is given by EQ. 1 and is performed after preprocessing (e.g., filtering) the recorded TEM signal. According to this embodiment, a class of models is chosen for inversion of the TEM signals. The class may include cylindrically-layered, horizontally-layered, or a more complicated medium. At block 330, selecting the class of models includes selecting the specific class based on the processing intended to be performed with the recovered TEM signal. The number of models used must be greater than the number of time points at which the TEM signal is recorded. As a result, "signal space," which is an n-dimensional vector space, is obtained, where n is the number of time points. Any measured TEM signal is assumed to belong to this space and, therefore, it is assumed that any measured TEM signal can be represented as a linear combination of the calculated signals. Thus, after choosing the model class (block 330), calculations of the synthetic signals for a wide range of medium parameters (e.g., resistivities, distances to bed), that is, calculating basic Eigen vectors, must be performed at block 340. The synthetic signals are given by:

$$S_{ij} = S_i(t_j), i=1,l,j=1,n$$ [EQ. 4]

l is the number of obtained models, and n is the number of time points.

The basic Eigen vectors or orthogonal basis $\hat{V}$ may be constructed for each vector space. An arbitrary signal from the space may be represented as a linear combination of the basic vectors. The number of terms in the linear representation depends on the required accuracy of the representation. The basic Eigen vectors (orthogonal basis $\hat{V}$) are constructed for the matrix $\hat{S}$ by a singular value decomposition (SVD) method:

$$\hat{S}^T \hat{S} \cdot \hat{V} = \hat{V} \cdot \hat{\Lambda}$$ [EQ. 5]

where $\hat{\Lambda}$ is a diagonal matrix of basic Eigen values. If $\hat{\Lambda}$ includes zero Eigen values, then Nr—rank of matrix $\hat{S}$—equals the number of non-zero basic Eigen values. The number of Eigen values m describing the signal cannot be greater than Nr.

At block 350, calculating the coefficients of linear representation using k Eigen vectors includes determining the Eigen values $\vec{X}$ for reconstruction of $\vec{F}$ as:

$$\vec{X} = \hat{V} \cdot \hat{M}^{-1} \cdot \vec{F} \quad [\text{EQ. 6}]$$

where $\hat{M}^2 = \hat{\Lambda}$. On the first step, the signal may be calculated with one basic Eigen vector that corresponds to a maximal basic Eigen value such that $\hat{M}$ contains only one maximal basic Eigen value and its dimension is 1. The dimension of $\vec{X}$ is also 1. At block 360, recovering the signal $R_j = R(t_j)$, j=1,n is based on the calculated Eigen values $\vec{X}$ according to:

$$\vec{R} \hat{M} \cdot \hat{V}^T \cdot \vec{X} \quad [\text{EQ. 7}]$$

At block 370, comparing the recovered signal with the original signal transformation includes determining a misfit measure Δ according to EQ. 3. At block 390, determining whether there is a good fit includes determining if the misfit measure Δ is below a predetermined value. When the recovered signal is a good fit with the original transformation, then the process includes providing the results at block 390 as Eigen values ($\vec{X}$). When the recovered signal is not a good fit with the original transformation, then the process includes increasing the number of vectors, at block 355, and the coefficients of linear representation are calculated again (block 350). This process of assessing the fit continues until block 390 is reached. After transmission (for example to the computing system 12 at the surface) to obtain and process the TEM signal, the processor of the computing system 12 would implement the processing of block 350. The number of transmitter parameters (k) is equal to the dimension of the vector $\vec{X}$.

A given TEM signal may be better suited for the method discussed with reference to FIG. 2 or to FIG. 3. Thus, both may be performed and the one resulting in the fewest transmission parameters may be chosen. The structure of the parameters allows a receiving processor to recognize which of the methods was used.

Figure 4:
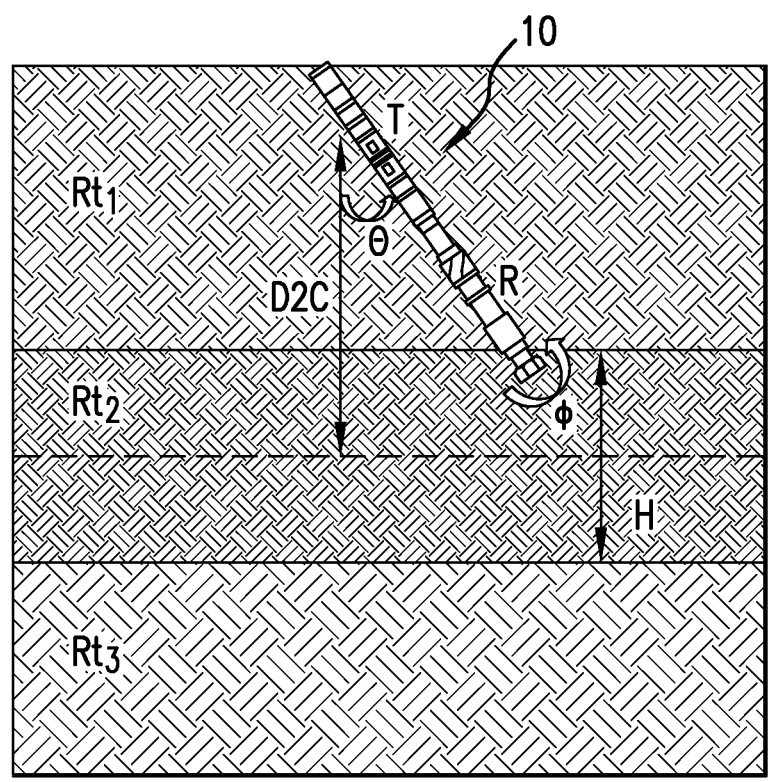
FIG. 4 shows a portion of the downhole tool in an exemplary case.

FIG. 4 shows a portion of the downhole tool 10 in an exemplary case. The exemplary case illustrates the methods discussed above. The spacing between the transmitter (T) and receiver (R) in the exemplary arrangement shown in FIG. 4 is 5 meters (m). When the current impulse in the transmitter coil is turned off, the coil moment is 1 A–m². The electromagnetic field is measured for all components (axial arrangements of the transmitter and receiver: xx, xy, xz, yx, yy, yz, zx, zy, zz). In the example, 200 time points are used from 5 micro seconds to 0.5 milliseconds. The three resistivities ($Rt_1$, $Rt_2$, $Rt_3$) indicated in FIG. 4 may be different values between 1 Ohm-m and 100 Ohm-m. The distance to bed center (D2C) may be a value from 0 to 32 m, and the dip θ and rotation angle φ of the downhole tool 10 may be between 0 and 90 degrees. The signal sets calculated on these models coincide for xx and yy components (78400 models), xy and yx components (57600 models), xz and yz components (67200 models), and zx and zy components (67200 models). For the zz component, 11200 models are computed.

The signal decays on average as $1/t_2$ on a chosen time interval. Thus, the TEM signal transformation is given by:

$$F_j = G(t_j) \cdot t^2, \; j=1,n, \; n=200 \quad [\text{EQ. 8}]$$

where $G(t_j)$ is the recorded and filtered exemplary TEM signal. The misfit measure Δ (given by EQ. 3 above) is considered acceptable if Δ is less than or equal to 0.5%. The weights $w_j$ are determined by initially setting $w_j$ as 1, j=1,n then increasing the weights near zero. If $F_{i-1} \cdot F_i < 0$ then $$w_{i-2} = \frac{F_{i-3}}{F_{i-2}},$$

$$w_{i-1} = \frac{F_{i-3}}{F_{i-1}},$$

$$w_i = \frac{F_{i+2}}{F_i},$$

$$w_{i+1} = \frac{F_{i+2}}{F_{i+1}}.$$

Calculations of signal transformation are obtained for the above models.

According to one exemplary illustration, the Eigen value method described with reference to FIG. 3 is used. An additional model set is needed to construct the orthogonal basis $\hat{V}$. The first set of models for calculation of the synthetic signals and the additional model set are disjoint. The range of parameters for the second set is smaller. Thus, the orthogonal basis $\hat{V}$ is constructed for the different signals that are recovered for the same class of models. A class of 3-layer models may be enough for the description of the TEM signals in the layered medium with an arbitrary number of the boundaries. Several experiments using the Eigen values method described with reference to FIG. 3 above show that the signals calculated for 4-, 5-, and 6-layer models are recovered with the same number of parameters as the ones calculated for the initial 3-layer model.

FIGS. 5-9 are histograms indicating the percentage of TEM signals that can be decompressed as a function of the number of parameters. The x axis 510 shows the number of parameters and the y axis 520 shows the corresponding percentage of TEM signals that can be decompressed. For the spline approximation method, the $C^2$ cubic spline type was used. Using the exemplary spline type, the minimal number of parameters is 4, namely the signal transformations and their derivatives at the first and last time points. None of the exemplary TEM signals requires more than 23 parameters for recovery. The average number of parameters needed for the exemplary TEM signals is between 6.3 and 10.8. It was found that 200 values of TEM signals represent strongly redundant data. The average number of parameters is given by:

$$N_{average} = \frac{\sum_{i=1}^{23} i \cdot q_i}{\sum_{i=1}^{23} q_i} \quad [\text{EQ. 9}]$$

where $q_i$ is the number of signals which can be recovered with i parameters.

Figure 5:
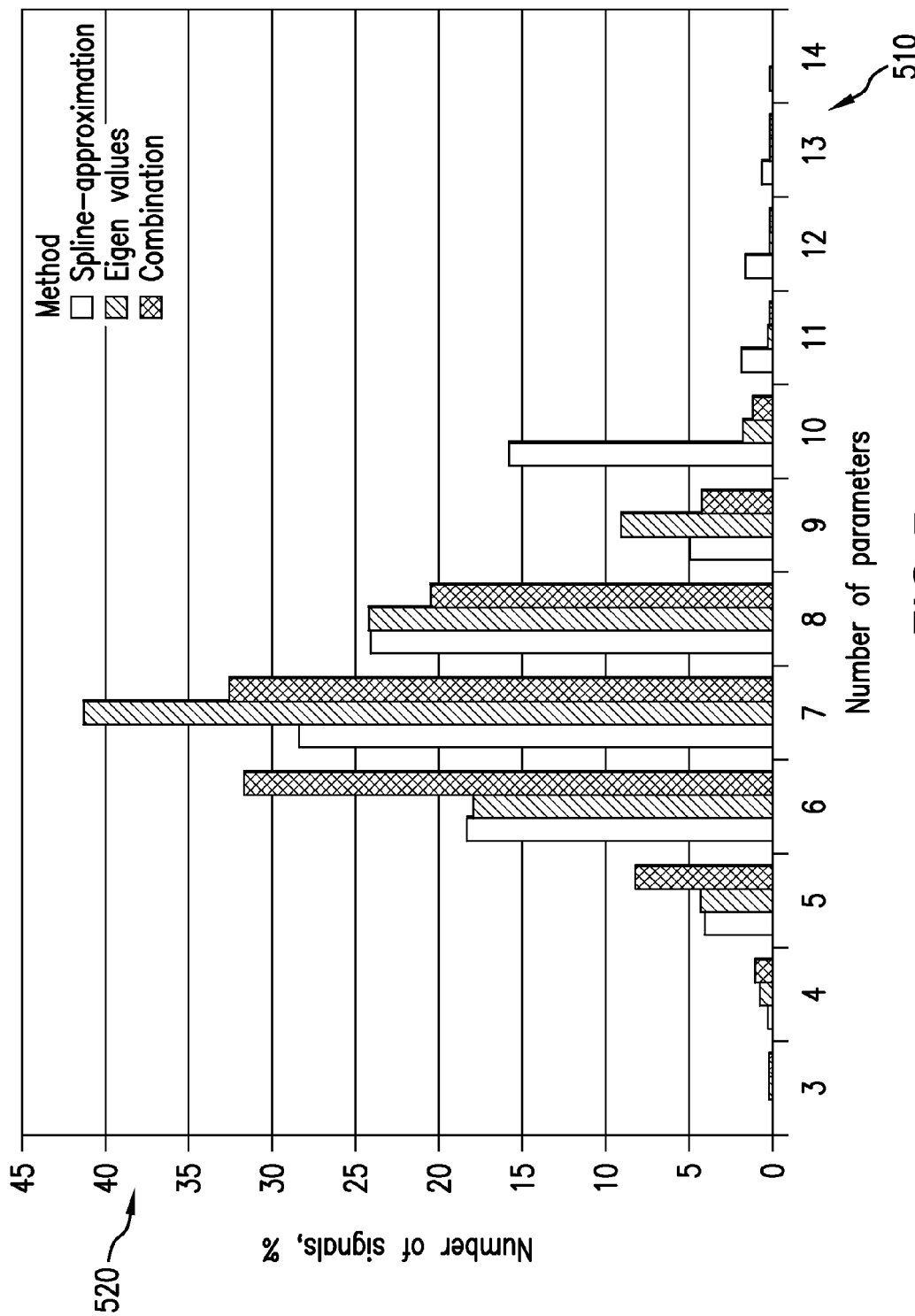
FIG. 5 is a histogram showing exemplary results obtained using 3-14 parameters for XX and YY components of exemplary TEM signals.

FIG. 5 is a histogram showing exemplary results obtained using 3-14 parameters for XX and YY components of exemplary TEM signals. As FIG. 5 indicates, the average number of parameters required using the spline approximation method discussed with reference to FIG. 2 is 7.7. The average number of parameters required using the Eigen value method discussed with reference to FIG. 3 is 7.2, and the average number of parameters required using the combination method—which tests both approaches and selects the one, for each given TEM signal, requiring the lowest number of parameters—is 6.8 parameters. The spline approximation method uses fewer parameters (relative to the Eigen value method and the combination method for 26% of the TEM signals. The Eigen value method uses fewer parameters (relative to the spline method and the combination method) for 52% of the TEM signals. The spline method and the Eigen value method both use the same number of parameters for 22% of the TEM signals.

Figure 6:
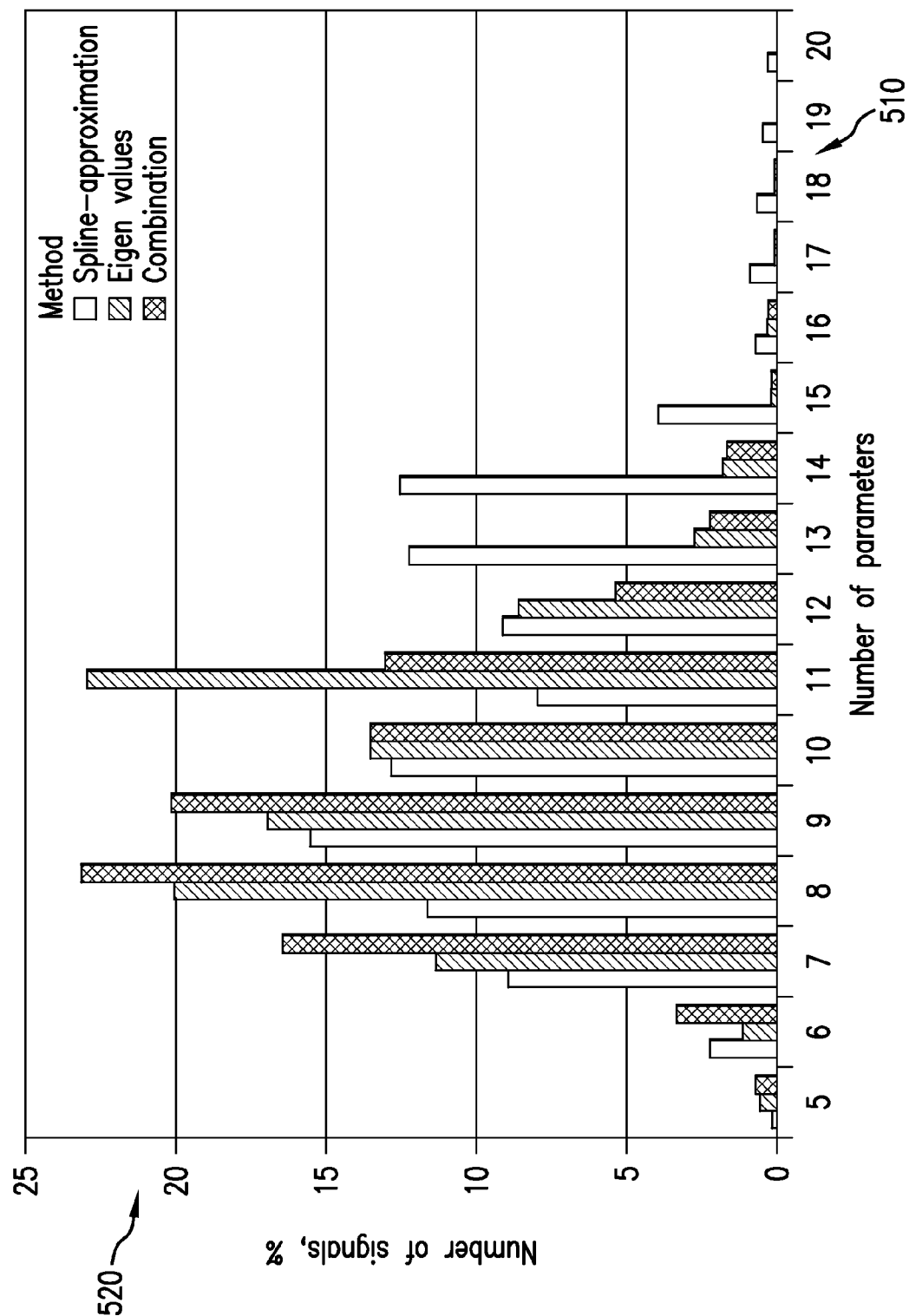
FIG. 6 is a histogram showing exemplary results obtained using 5-20 parameters for XY and YX components of exemplary TEM signals.

FIG. 6 is a histogram showing exemplary results obtained using 5-20 parameters for XY and YX components of exemplary TEM signals. As FIG. 6 indicates, the average number of parameters required using the spline approximation method is 10.8. The average number of parameters required using the Eigen value method is 9.6, and the average number of parameters required using the combination method is 9.18 parameters. The spline approximation method uses fewer parameters (relative to the Eigen value method and the combination method) for 26% of the TEM signals. The Eigen value method uses fewer parameters (relative to the spline method and the combination method) for 61% of the TEM signals. The spline method and the Eigen value method both use the same number of parameters for 13% of the TEM signals.

Figure 7:
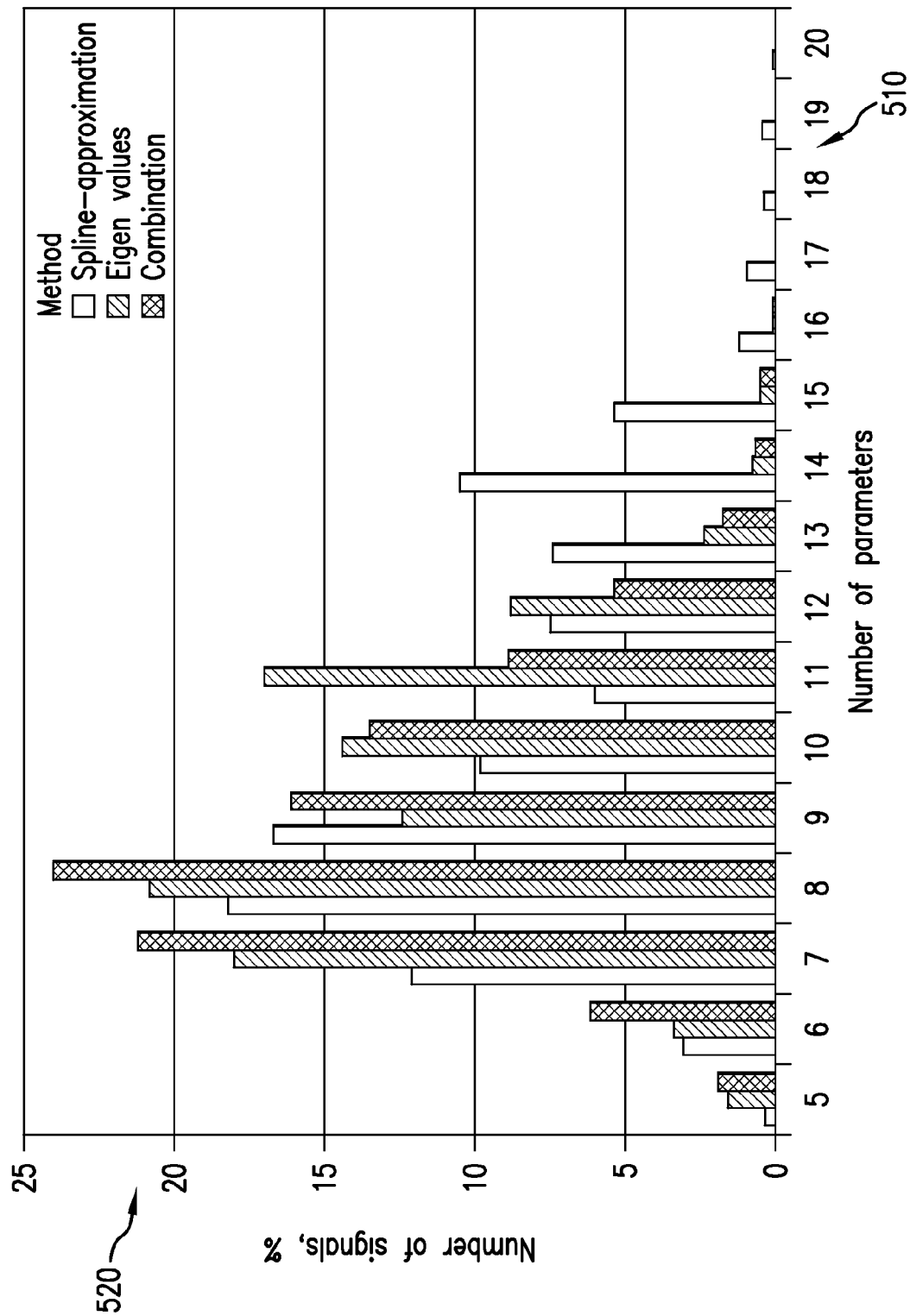
FIG. 7 is a histogram showing exemplary results obtained using 5-20 parameters for XZ and YZ components of exemplary TEM signals.

FIG. 7 is a histogram showing exemplary results obtained using 5-20 parameters for XZ and YZ components of exemplary TEM signals. As FIG. 7 indicates, the average number of parameters required using the spline approximation method is 10.3. The average number of parameters required using the Eigen value method is 9.2, and the average number of parameters required using the combination method is 8.7 parameters. The spline approximation method uses fewer parameters (relative to the Eigen value method and the combination method) for 25% of the TEM signals. The Eigen value method uses fewer parameters (relative to the spline method and the combination method) for 59% of the TEM signals. The spline method and the Eigen value method both use the same number of parameters for 16% of the TEM signals.

Figure 8:
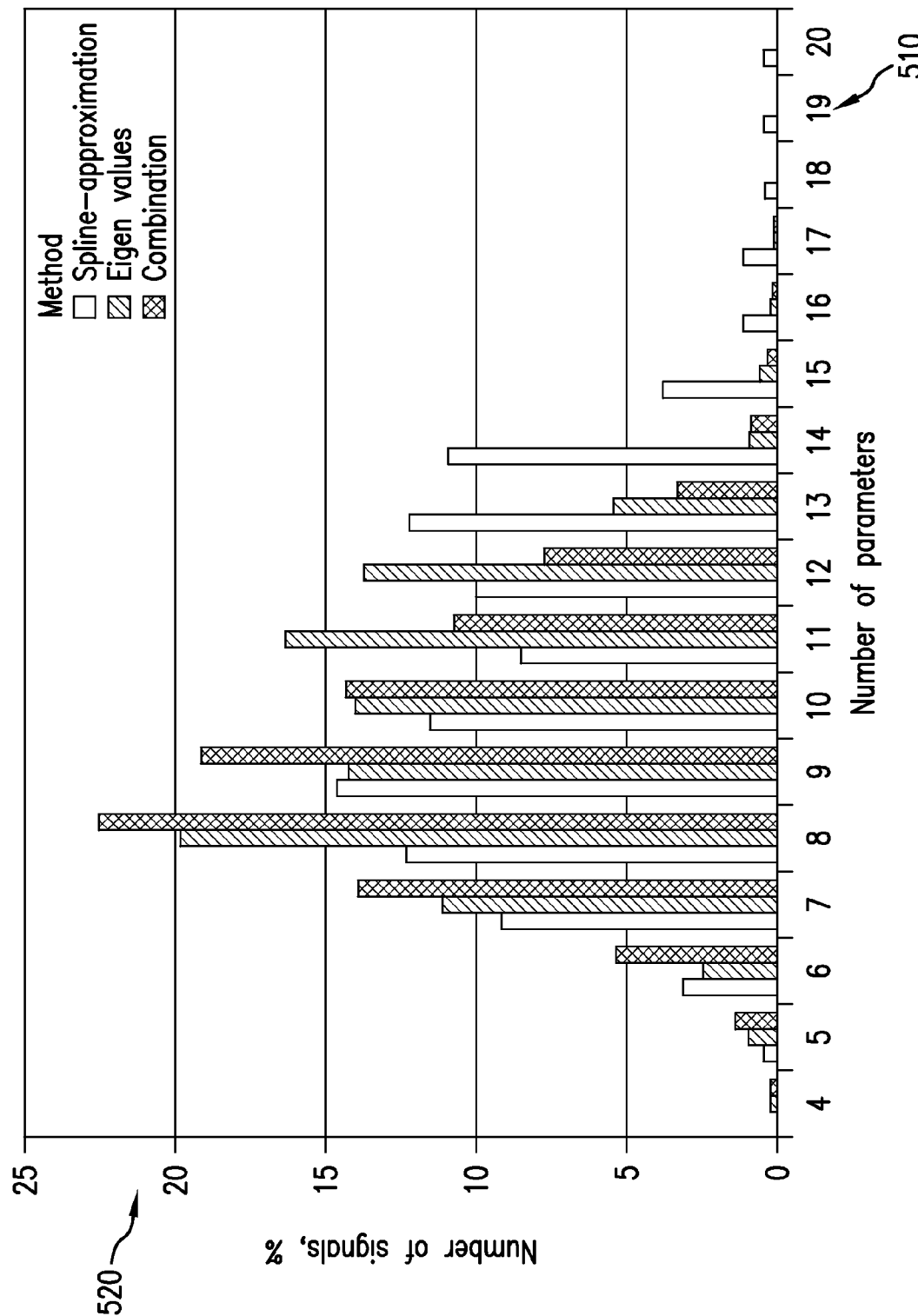
FIG. 8 is a histogram showing exemplary results obtained using 4-20 parameters for ZX and ZY components of exemplary TEM signals.

FIG. 8 is a histogram showing exemplary results obtained using 4-20 parameters for ZX and ZY components of exemplary TEM signals. As FIG. 8 indicates, the average number of parameters required using the spline approximation method is 10.7. The average number of parameters required using the Eigen value method is 9.7, and the average number of parameters required using the combination method is 9.1 parameters. The spline approximation method uses fewer parameters (relative to the Eigen value method and the combination method) for 30% of the TEM signals. The Eigen value method uses fewer parameters (relative to the spline method and the combination method) for 58% of the TEM signals. The spline method and the Eigen value method both use the same number of parameters for 12% of the TEM signals.

Figure 9:
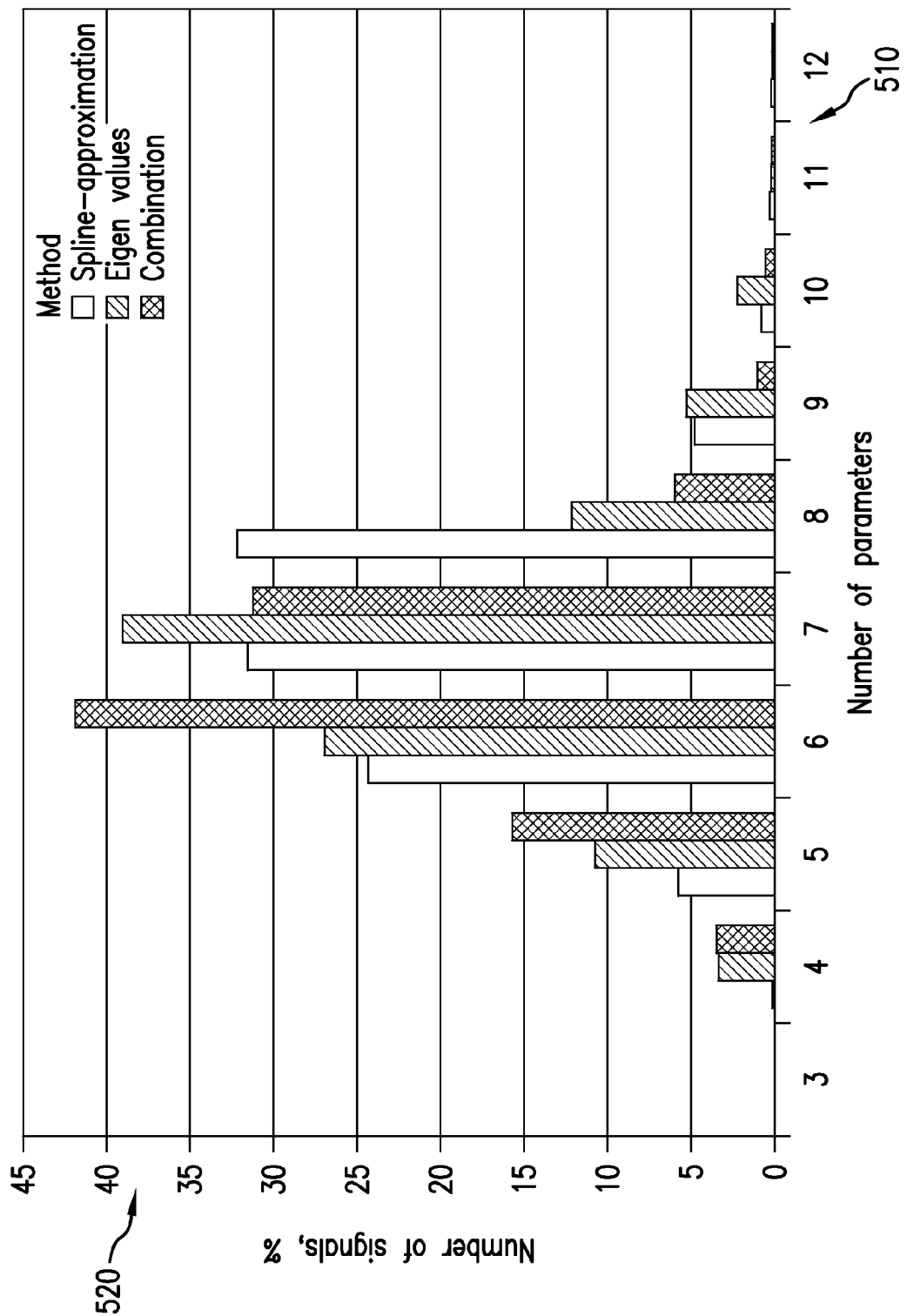
FIG. 9 is a histogram showing exemplary results obtained using 4-20 parameters for the ZZ component of exemplary TEM signals.

FIG. 9 is a histogram showing exemplary results obtained using 4-20 parameters for the ZZ component of exemplary TEM signals. As FIG. 9 indicates, the average number of parameters required using the spline approximation method is 7.1. The average number of parameters required using the Eigen value method is 6.7, and the average number of parameters required using the combination method is 6.3 parameters. The spline approximation method uses fewer parameters (relative to the Eigen value method and the combination method) for 30% of the TEM signals. The Eigen value method uses fewer parameters (relative to the spline method and the combination method) for 48% of the TEM signals. The spline method and the Eigen value method both use the same number of parameters for 22% of the TEM signals.

As the examples above illustrate, the combination method (selecting by comparing the results of the spline method and the Eigen value method) does not significantly decrease the average number of parameters that must be transmitted to recover the original TEM signal. This indicates that there are no special classes of curves (TEM signals) for which one of the methods of data compression is preferable (results in fewer required numbers of parameters).

Figure 10:
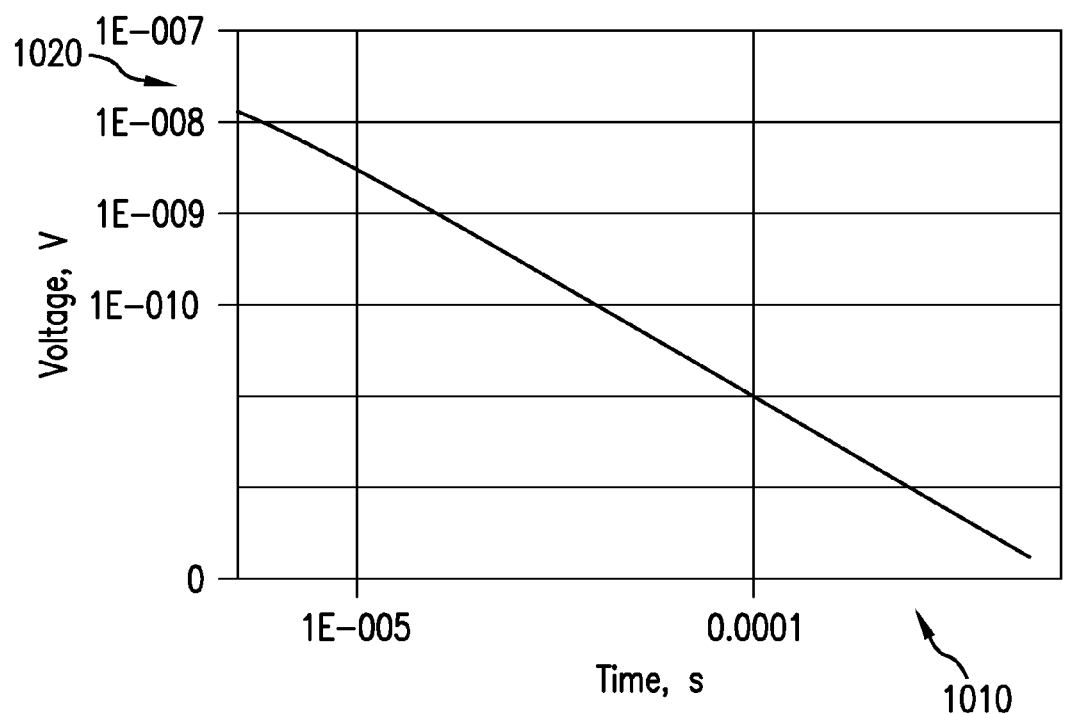
FIG. 10 illustrates one exemplary TEM signal.

FIG. 10 illustrates one exemplary TEM signal. The ZZ component is shown in FIG. 10. Time is shown on the x axis 1010, and voltage based on the measured TEM signal is shown on the y axis 1020. The exemplary curve is obtained with a setup shown in FIG. 4 having resistivity values: $Rt_1$=3.16 Ohm-m; $Rt_2$=1 Ohm-m; $Rt_3$=100 Ohm-m, height of the layer (H)=0.5 m, D2C=0 m, tool dip angle ($\theta$)=60 degrees, and rotation angle ($\phi$)=0 degrees. The curve shown in FIG. 10 may be represented by 3 parameters based on the Eigen values method and 4 parameters based on the spline approximation method.

Figure 11:
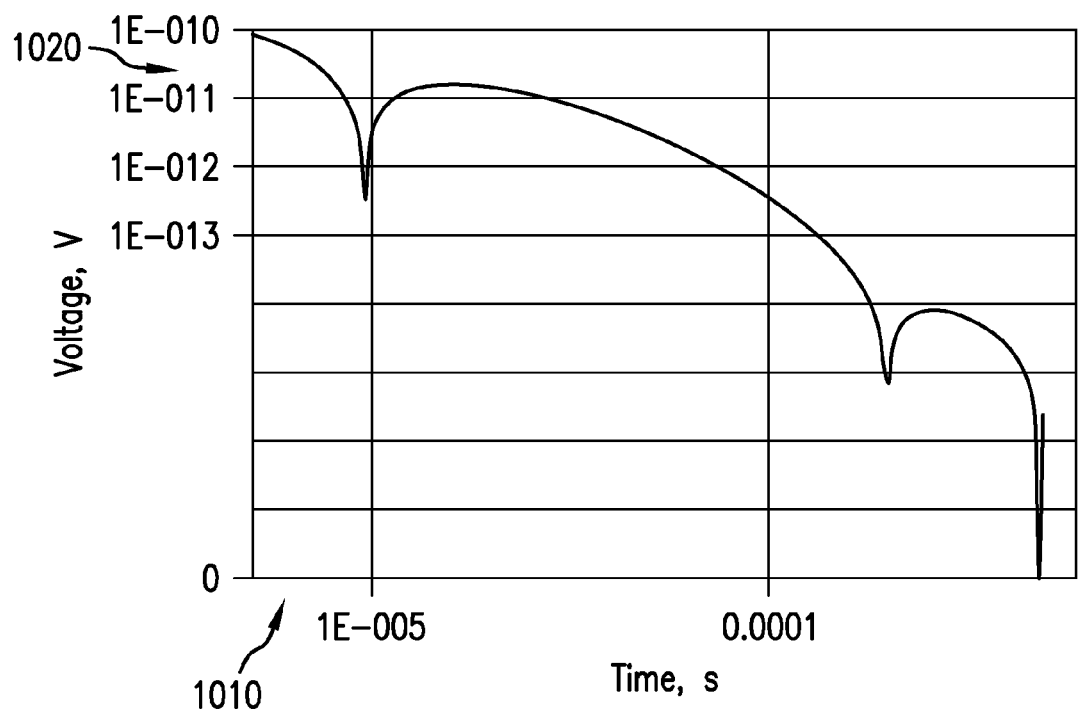
FIG. 11 illustrates another exemplary TEM signal.

FIG. 11 illustrates another exemplary TEM signal. The XZ component is shown in FIG. 11. Time is shown on the x axis 1010, and voltage based on the measured TEM signal is shown on the y axis 1020. The exemplary curve is obtained with a setup shown in FIG. 4 having resistivity values: $Rt_1$=1 Ohm-m; $Rt_2$=31.6 Ohm-m; $Rt_3$=10 Ohm-m, height of the layer (H)=15 m, D2C=24 m, tool dip angle ($\theta$)=45 degrees, and rotation angle ($\phi$)=0 degrees. The curve shown in FIG. 11 may be represented by 19 parameters based on the Eigen values method and 14 parameters based on the spline approximation method.

Figures 12, 13:
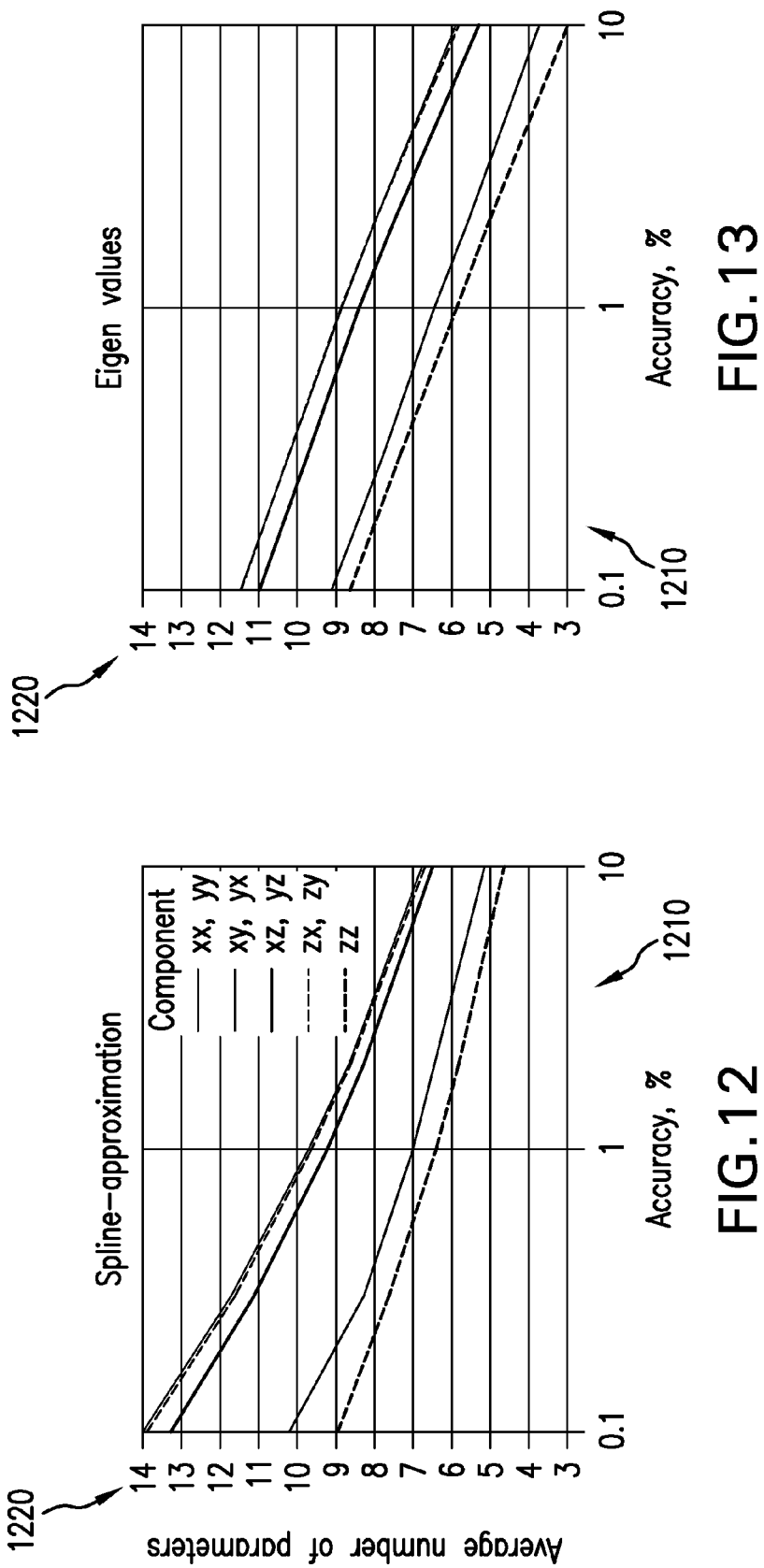
FIGS. 12 and 13 illustrate exemplary dependence on accuracy of the reconstruction on an average number of parameters of the compressed signal.

FIGS. 12 and 13 illustrate exemplary dependence on accuracy of the reconstruction on an average number of parameters of the compressed signal. Accuracy is shown on the x axis 1210, and the average number of parameters are shown on the y axis 1220 for the Spline approximation method (FIG. 12) and for the Eigen values method (FIG. 13).

Figures 14, 15:
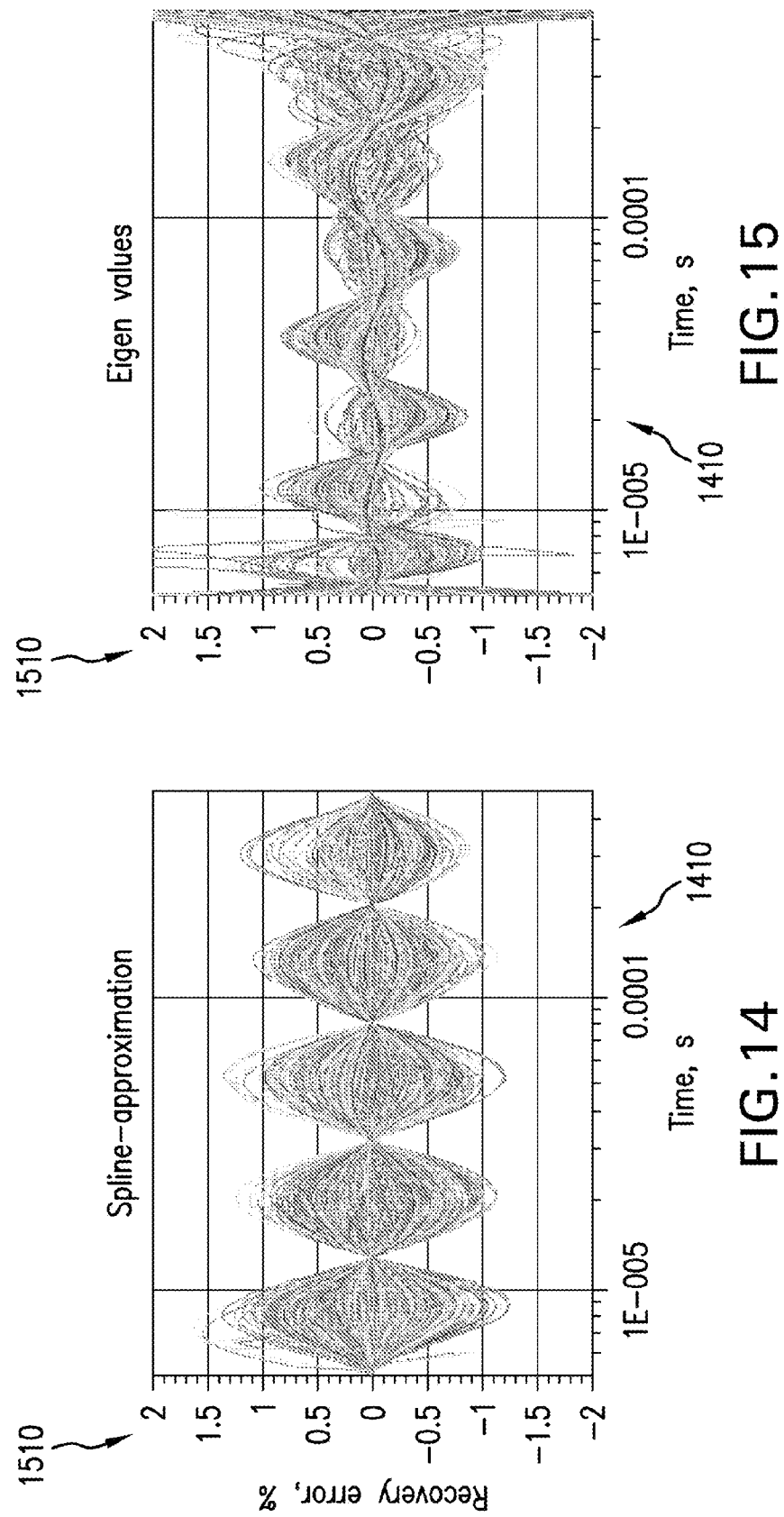
FIGS. 14 and 15 illustrate recovery error during reconstruction of a compressed signal.

FIGS. 14 and 15 illustrate recovery error during reconstruction of a compressed signal. Time in seconds is shown on the x axis 1410, and recovery error as a percentage (%) is shown on the y axis 1420 for the Spline approximation method (FIG. 14) and for the Eigen values method (FIG. 15). As FIG. 14 illustrates, the recovery error related to the Spline approximation method looks sinusoidal. The recovery error is zero in 6 spline nodes and is either maximal or indicates a change in sign in the center of the interval between nodes. The recovery error resulting from using the Eigen values method also shows some regularity. The recovery looks cosinusoidal. FIG. 15 indicates 7 intervals and 2 semi-intervals with similar error behavior. The number of whole intervals equals the number of decompression parameters. The error at a given point in time may be considered as a random variable. Then, the distribution of the random variable may be studied and used in the inversion scheme.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A system to compress transient signals, the system comprising:
   a transmitter disposed in a borehole and configured to change a transmitted current and induce a current in an earth formation;
   a receiver disposed in the borehole and configured to receive the transient signals resulting from the transmitted current; and
   a processor configured to make a selection, for each of the transient signals, among a spline approximation method and an Eigen value method according to which among the spline approximation method and the Eigen value method results in a fewer number of parameters representing the transient signal, and to compress the transient signal according to the selection.

2. The system according to claim 1, further comprising a telemetry system to transmit the parameters representing the transient signal to a surface processor.

3. The system according to claim 1, wherein the processor is disposed in the borehole and transmits the parameters representing each transient signal to a surface location.

4. The system according to claim 1, wherein the processor performs filtering and a transform of each transient signal prior to compression.

5. The system according to claim 1, wherein the processor is configured to implement the spline approximation method by selecting a spline type.

6. The system according to claim 5, wherein the processor is further configured to calculate spline coefficients as the parameters representing the transient signal for each transient signal based on choosing nodes among discrete time points according to the spline type.

7. The system according to claim 6, wherein the processor iteratively calculates the spline coefficients based on a comparison of a signal recovered from the spline coefficients with the transient signal represented by the spline coefficients.

8. The system according to claim 1, wherein the processor is configured to implement the Eigen value method by calculating basic Eigen vectors based on selecting a class of models.

9. The system according to claim 8, wherein the processor is further configured to calculate coefficients of linear representation of the transient signal as the parameters representing the transient signal using the basic Eigen vectors.

10. The system according to claim 9, wherein the processor selects the class of models based on a type of processing expected for the transient signal recovered from the coefficients.

11. A method of compressing transient signals, the method comprising:
    obtaining the transient signals;
    making a selection, for each of the transient signals, among a spline approximation method and an Eigen value method according to which among the spline approximation method and the Eigen value method results in a fewer number of parameters representing the transient signal;
    compressing, using a processor, each of the transient signals, according to the selection; and
    transmitting the parameters representing each transient signal for recovery of the transient signal.

12. The system according to claim 11, wherein the obtaining the transient signal includes disposing a transmitter in a borehole, the transmitter configured to change a current transmitted into a formation, and disposing a receiver in the borehole, the receiver configured to receive the transient signals based on current induced in the formation by the transmitter.

13. The method according to claim 11, further comprising filtering and transforming each transient signal prior to the processor compressing the transient signals.

14. The method according to claim 13, wherein the transforming each transient signal is based on a number of time values at which the transient signal is recorded.

15. The method according to claim 11, wherein the processor compressing the transient signal based on the spline approximation method includes selecting a cubic spline type and calculating time derivatives at a first time point and a last time point at which the transient signal is recorded.

16. The method according to claim 15, wherein the processor compressing the transient signal based on the spline approximation method further includes calculating spline coefficients as the parameters representing the transient signal based on values of the transient signal at selected nodes and on the time derivatives calculated for the transient signal.

17. The method according to claim 16, further comprising the processor iteratively calculating the spline coefficients based on a comparison of a signal recovered from the spline coefficients with the transient signal represented by the spline coefficients.

18. The method according to claim 11, wherein the processor compressing the transient signal based on the Eigen value method includes calculating basic Eigen vectors based on selecting a class of models.

19. The method according to claim 18, wherein the processor compressing the transient signal based on the Eigen value method further includes calculating coefficients of linear representation of the transient signal as the parameters representing the transient signal using the basing Eigen vectors.

20. The method according to claim 19, further comprising the selecting the class of models based on a type of processing expected for the transient signal recovered from the coefficients.

* * * * *